United States Patent
Suggs

(10) Patent No.: US 9,907,046 B2
(45) Date of Patent: Feb. 27, 2018

(54) AIRBORNE NETWORK DEVICE FOR A WIRELESS MESH NETWORK

(71) Applicant: Landis+Gyr Innovations, Inc., Alpharetta, GA (US)

(72) Inventor: Kenneth Randall Suggs, Cumming, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 76 days.

(21) Appl. No.: 14/957,044

(22) Filed: Dec. 2, 2015

(65) Prior Publication Data

US 2016/0183214 A1 Jun. 23, 2016

Related U.S. Application Data

(60) Provisional application No. 62/094,337, filed on Dec. 19, 2014.

(51) Int. Cl.
| | | |
|---|---|---|
| *H04W 64/00* | (2009.01) | |
| *H04B 7/26* | (2006.01) | |
| *H04W 16/26* | (2009.01) | |
| *H04B 7/185* | (2006.01) | |
| *H04W 84/18* | (2009.01) | |
| *H04W 88/04* | (2009.01) | |

(52) U.S. Cl.
CPC ...... *H04W 64/003* (2013.01); *H04B 7/18504* (2013.01); *H04B 7/2606* (2013.01); *H04W 16/26* (2013.01); *H04W 84/18* (2013.01); *H04W 88/04* (2013.01)

(58) Field of Classification Search
CPC .. H04W 64/003; H04W 16/26; H04B 7/2606; H04B 7/18504
See application file for complete search history.

(56) References Cited

U.S. PATENT DOCUMENTS

| | | | | |
|---|---|---|---|---|
| 9,083,425 | B1 * | 7/2015 | Frolov | H04B 7/18504 |
| 2012/0327858 | A1 * | 12/2012 | Alcorn | H04B 7/18506 |
| | | | | 370/328 |

(Continued)

FOREIGN PATENT DOCUMENTS

| | | |
|---|---|---|
| EP | 2312766 | 4/2011 |
| WO | 03085860 | 10/2003 |

(Continued)

OTHER PUBLICATIONS

PCT/US2015/063645, "International Search Report and Written Opinion", dated Mar. 30, 2016, 10 pages.

(Continued)

*Primary Examiner* — Thai Nguyen
(74) *Attorney, Agent, or Firm* — Kilpatrick Townsend & Stockton LLP

(57) ABSTRACT

A network device is mounted to an aerial device and facilitates communication between components of a wireless mesh network. The components of the wireless mesh network may include network devices that include a metrology module for measuring resource consumption, routers, and collectors. The airborne network device may enable communication between a network device and a central system. Alternatively, the airborne network device may provide additional bandwidth during periods of high network activity.

17 Claims, 4 Drawing Sheets

(56) References Cited

U.S. PATENT DOCUMENTS

2014/0241239 A1    8/2014  Chang et al.
2014/0320306 A1*  10/2014  Winter .................. G01D 4/004
                                                          340/870.02

FOREIGN PATENT DOCUMENTS

WO        2014160997      10/2014
WO        2016099920       6/2016

OTHER PUBLICATIONS

"Unmanned AirLinx Drone Aircraft Can Read Utility Meters Automatically", posted by the moderator of REMIXX WORLD!, retrieved from the Internet: <URL:http://remixxworld.blogspot.com/2010/06/unmanned-airlinx-drone-aircraft-can.html> [retrieved on Dec. 29, 2014], Jun. 12, 2010, 2 pages.

Davis , "How Drones Will Change the Utility Industry", Border States, retrieved from the Internet: <URL:http://solutions.borderstates.com/how-drones-will-change-the-utility-industry> [retrieved on Dec. 29, 2014], Jul. 8, 2014, 4 pages.

McNeal , "FAA Approves Limited Use of Drones for Utility Company", Forbes, retrieved from the Internet: <URL:http://www.forbes.com/sites/gregorymcneal/2014/07/12/faa-approves-limited-use-of-drones-for-san-diego-utility-company/> [retrieved on Dec. 29, 2014], Jul. 12, 2014, 4 pages.

* cited by examiner

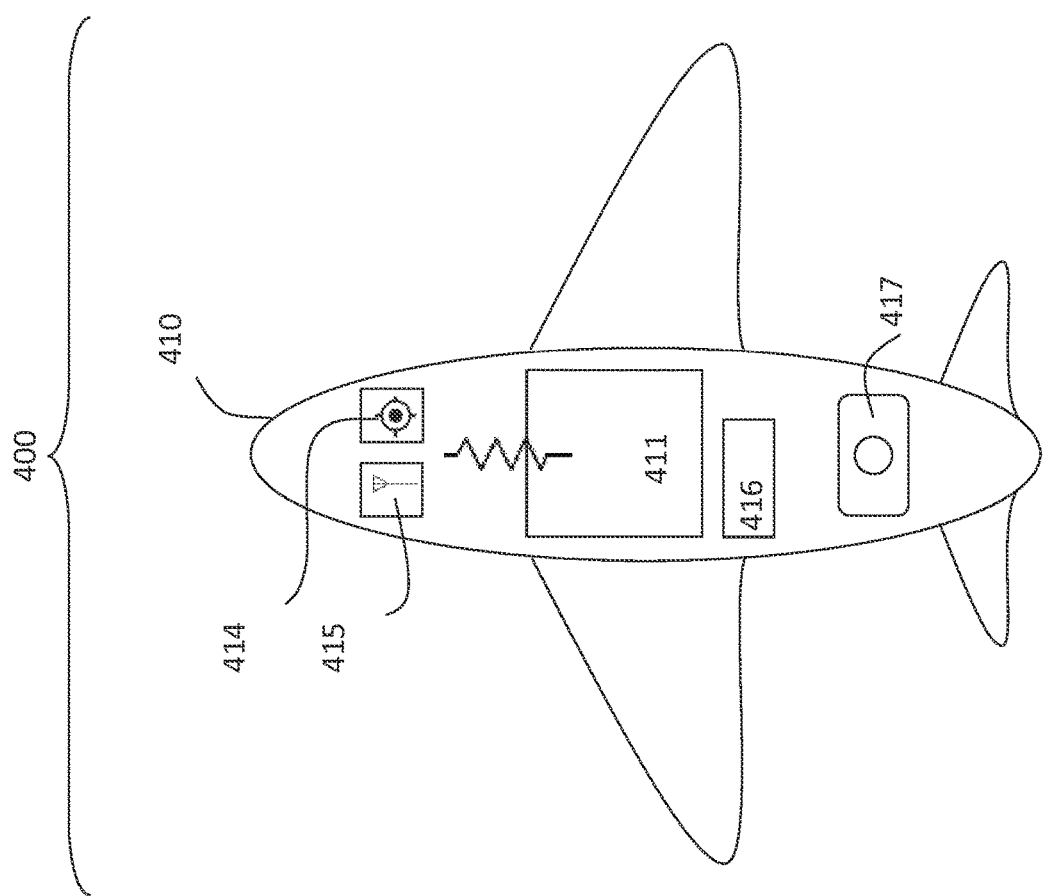

AIRBORNE NETWORK DEVICE FOR A WIRELESS MESH NETWORK

CROSS-REFERENCE TO RELATED APPLICATION

This application claims priority to U.S. Provisional Patent Application No. 62/094,337 filed Dec. 19, 2014, entitled "AIRBORNE NETWORK DEVICE FOR A WIRELESS MESH NETWORK," which is incorporated herein in its entirety by reference.

TECHNICAL FIELD

The invention generally relates to a network device, and more particularly relates to using an airborne network device in a wireless mesh network.

BACKGROUND OF THE INVENTION

Wireless mesh networks may be used to interconnect devices located at premises where a resource, such as electricity, water, or gas is consumed. The devices may include a metrology module to measure consumption of the resource and a wireless communication module to communicate with other nodes on the network. The devices may also communicate with a centralized or semi-centralized data collection system, often called a "head-end system." One example of a head-end system is the COMMAND CENTER system provided by Landis+Gyr. In addition to the devices located at the premises, the network may include other types of devices, such as routers, collectors, concentrators, or repeaters.

In some areas the devices are relatively close together so one device can easily communicate with one or more neighboring devices. In other areas the devices may be spaced much further apart. If so, then one device may have fewer neighboring devices. In this situation, the network may be vulnerable since failure of a single node may impair communications not only from the node that failed, but also from other nodes that relied upon the failed node for communications.

One way to improve the reliability of the network when the devices are spaced far apart is to include additional network devices, e.g., routers or collectors. The number of routers and collectors needed to support a network is determined by the number and locations of the devices and the available mounting locations. Generally, the higher above ground the routers and/or collectors can be mounted, the fewer devices required. For example, 1200 routers on 20 foot poles may be needed to support 14,000 utility meters located across a large rural area because the meters are so geographically dispersed. If the routers are placed at a higher location, then the number of routers may be reduced. If the routers are mounted at approximately 30 feet, then 750 routers may be required. If the routers are mounted at approximately 40 feet, then 400 routers may be required. However, to mount the routers at these higher locations, a special structure, such as a tower, may be needed. Many utilities do not commonly have poles where network equipment can be mounted higher than 20-30 feet.

Thus, there is a need to provide network devices at higher locations without requiring a special structure. In addition, there is a need to deploy network devices to locations that may be remote or inaccessible. There is also a need to deploy network devices temporarily if an existing node fails.

BRIEF SUMMARY OF THE INVENTION

Systems and methods are provided for enabling communication in a wireless mesh network where at least one of the network devices is mounted to an aerial device. The network device mounted to the aerial device may be placed in one or more aerial positions to allow it to communicate with any number of fixed network devices. In some configurations, the network device mounted to the aerial device may communicate with other airborne network devices, as well as fixed network devices. In some configurations, the airborne network device may direct wireless communications between fixed devices, or may also collect and store data for communication to a head-end system when the aerial device is capable of communication with the head-end system or other fixed devices on the wireless mesh network. In each of the described configurations, communications may be delivered in one direction or in two directions; for example, resource measurement data may be delivered from an electric metering device located at a premises to a head-end system, or a disconnect command may be delivered from the head-end system to a metering device. The fixed network devices may be associated with multiple premises and may include a metrology module for measuring and controlling resource usage at the particular premises where they are located.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE DRAWINGS

The invention will be better understood from the following description when considered in connection with the accompanying figures. It is to be expressly understood, however, that each of the figures is provided for the purpose of illustration and description only, and is not intended as a definition of the limits of the present invention.

FIG. 4 is a block diagram illustrating an exemplary airborne network device.

DETAILED DESCRIPTION OF THE INVENTION

The invention facilitates communication within a wireless mesh network by providing a network device mounted to an aerial device. By controlling the flight path of the aerial device, the network device may be placed in one or more aerial positions that allow it to communicate with other network devices. The airborne network device may also be configured to store data that is communicated to it, and to transmit the stored data when the airborne network device is positioned such that it may communicate with other network devices.

Exemplary Networks

Figure 1:
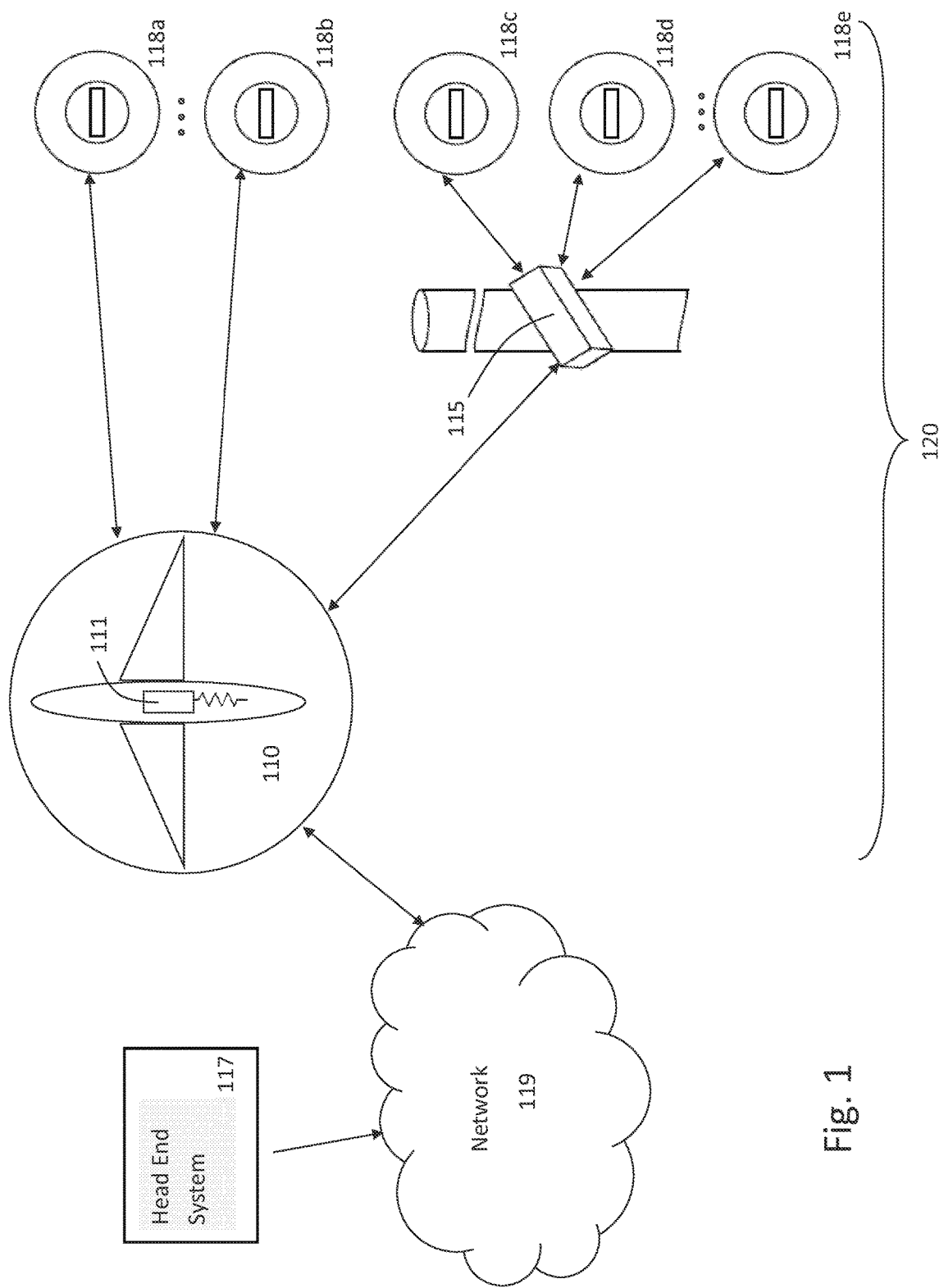
FIG. 1 is a block diagram illustrating one exemplary network.

FIG. 1 illustrates a portion of a wireless mesh network 120. The network may utilize any suitable communication technology, including high-frequency radio, microwave, power line communication (PLC), or cellular technologies. The illustrated network includes a number of devices 118a-118e, a collector 115, and a network device 111 provided on an aerial device 110. Each of devices 118a-118e may include a metrology module and a wireless communication module and may be associated with a premises. The devices 118a-118e may communicate with a head-end system 117 by sending and receiving messages via other network devices including fixed routers (not shown), fixed collectors 115, a network device 111 mounted to an aerial device 110, or other devices 118a-118e. For example, FIG. 1 illustrates that devices 118a, 118b communicate with the head-end system 117 via the network device 111, and devices 118c-118e communicate with the head-end system via collector 115 and also the network device 111. The network device 111 may be a router or a collector or a device similar to those associated with a premises.

Depending upon the type of network device mounted to aerial device 110 and the network configuration, the device 111 may communicate with the head-end system via another device in the mesh network, such as collector 115 or via devices in another network, such as network 119. Network 119 may be another wireless mesh network or may be a public or private network. The communications illustrated by FIG. 1 are exemplary and may change as network conditions change. For example, FIG. 1 illustrates device 118a communicating directly with device 111. Device 118a may alternatively communicate through device 118b so that communications between device 111 and device 118a pass through device 118b. The network device 111 may also store data or commands to be delivered when the aerial device 110 is capable of communicating with the head-end system 117 or a particular device on wireless mesh network 120.

The aerial device follows a flight path that is suitable for the particular network in which it operates. One exemplary flight path may be to move around the area where a number of the devices are located. This would allow the devices in the area to communicate with the network device on the aerial device when it is within range. The altitude of the flight path may vary during flight. The altitude of the flight path may affect the flight path. For example, a flight path with a higher altitude may need to cover less distance than a flight path with a lower altitude to communicate with the same devices. The aerial device may hover in a single location, may circle a location, or may repeat its flight path or a portion of the path multiple times. The aerial device may also travel across multiple mesh networks during a single flight.

Another exemplary flight path may be to ascend to a predetermined altitude and then descend to approximately the same location so that the aerial position and the ground position are generally aligned. This flight path may be used if the aerial device has limited flight capabilities or is tethered to a stationary structure. If the aerial device is tethered, then the tether may provide a mechanical connection or may provide an electrical connection that includes power for the network device and/or a communication path for the network device.

In some networks where the devices at the premises are configured to communicate on a schedule, the flight path may be coordinated with the scheduled communication. This type of flight may be useful even in areas where the devices are located relatively close together since it may provide additional bandwidth during periods of high network activity.

The flight of the aerial device may be under the control of a human operator or may be automated. If the flight of the aerial device is scheduled, additional or alternative flights may be initiated in response to sensed network conditions, to commands received from the head-end system, or to other received commands.

An airborne network device may be used to repair a damaged network, either temporarily or permanently. For example, if the failure of one or more network devices either disables the network or negatively impacts network performance, an airborne network device may be deployed. Once the network is repaired, the airborne network device may no longer be used.

The aerial device may have one or more functions other than providing an airborne network device for the mesh network. For example, the aerial device may provide other flight services. If so, then the flight path may be determined by the other function(s) of the aerial device. In this situation, the network device mounted on the aerial device may be operational on all flights or may be operational on selected flights, depending upon the needs of the network. Alternatively, the network device may be mounted to the aerial device as needed so that it is not present for every flight of the aerial device.

Figure 2:
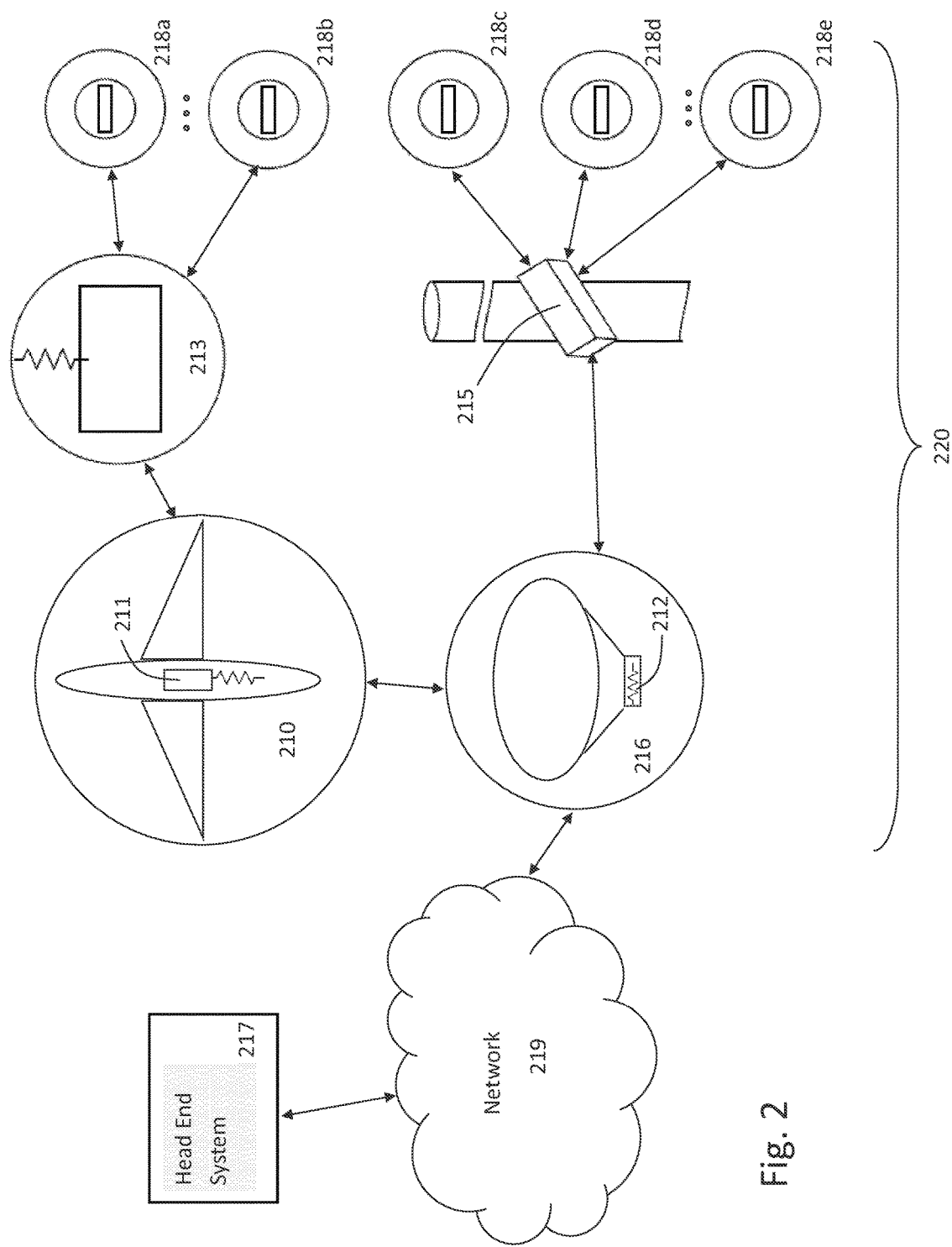
FIG. 2 is a block diagram illustrating another exemplary network.

FIG. 2 illustrates a portion of another wireless mesh network 220. The illustrated network includes a number of devices 218a-218e, a router 213, a collector 215, and a network device 211 provided on a first aerial device 210, a network device 212 provided on a second aerial device 216. Each of devices 218a-218e may include a metrology module and a wireless communication module and may be associated with a premises. The devices 218a-218e may communicate with a head-end system 217 by sending and receiving messages via other network devices including fixed routers 213, fixed collectors 215, devices 211, 212 mounted to aerial device 210, 216, or other devices 218a-218e. For example, FIG. 2 illustrates that devices 218a-218b communicate with the head-end system 217 via fixed router 213, device 211, device 212 and network 219 and devices 218c-218e communicate with the head-end system via fixed collector 215, device 212 and network 219.

FIG. 2 illustrates two airborne network devices 211, 212 and communication between the two devices. The communication may take place while both devices are in flight or may take place after one or both of the aerial devices has landed. The flight paths for the aerial devices 210, 216 may be independent of each other or the flight paths may be coordinated. They may be coordinated so that both devices are airborne at the same time to allow for communication between the devices 211 and 212 during flight. In one example, aerial device 216 may follow a more limited flight path than aerial device 210.

Although both FIG. 1 and FIG. 2 illustrate that communications with the head-end system pass through network 219, in some implementations, an airborne network device 211, 212 may communicate with the head-end system directly or via the wireless mesh network.

The devices 218a-218e may communicate information related to resource use, operation and status of the device (including errors or exception conditions), responses to received queries, and network communications. The head-end may send the devices 218a-218e firmware or parameter updates, queries, or commands for controlling the devices.

Exemplary Airborne Network Device

In FIG. 4, an exemplary airborne network device 400 is shown. The aerial device 410 may have positioned on it a network device 411, which may communicate with other network devices. Examples of aerial devices include drones, planes, balloons, and blimps. The network device 411 may have processing and memory components, which may allow for storage of received data. The memory components may additionally store instructions for the operation of the airborne network device, or for operation of a fixed network device. A power supply 416 may supply power to the network device 411 and possibly to other devices. Although FIG. 4 illustrates that the power supply is external to the network device 411, it may alternatively be part of the device. The aerial device 410 may have components to guide movement, such as a self-guidance system 414, or a remote guidance system 415. The aerial device 410 may also have a camera or other imaging components 417. The imaging capabilities of these components 417 may include still photography, motion videography, or specialized capabilities such as infrared imaging, radio frequency (RF) imaging, or any other type of appropriate imaging technique. The imaging components 417 may be configured to capture data according to a schedule; upon predetermined conditions; or upon being triggered, such as by an event or a received signal (e.g., from an operator). Other configurations to capture image data will be apparent to one skilled in the art. The imaging components 417 may be controlled by the device 411 so that the head-end system may send instructions for operating the components. Alternatively, the imaging components may be independently controlled.

The imaging component 417 may be used to obtain images of a particular network device. For example, an image of a device associated with a premises may be used to determine whether there is evidence of damage or may be used to confirm operation of the device. The image may supplement information communicated through the network describing the status of the device. In the case of a network outage, an image may help identify a source of the outage. In the case of a network outage due to a storm or other severe weather, the aerial device may be able to travel to an area that may be inaccessible to vehicles traveling via ground.

The images obtained by the imaging component may be stored within the device 411 or communicated to the head-end system.

Exemplary Network Device

Figure 3:
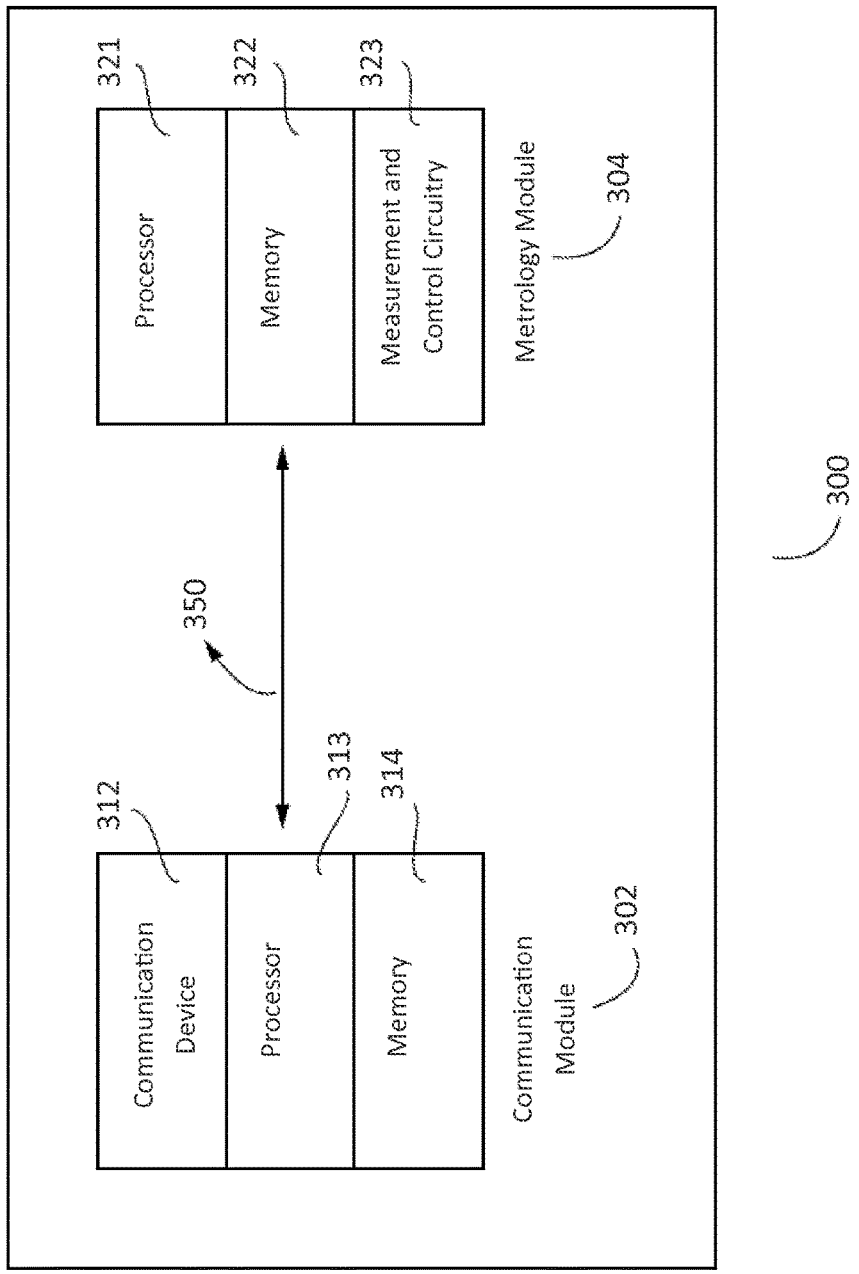
FIG. 3 is a block diagram illustrating an exemplary network device.

As shown in FIG. 3, a network device 300 used at a premises may include a communication module 302 and a metrology module 304. The function of the communication module 302 is to receive and send messages through the wireless mesh network. The function of the metrology module is to manage the resource, in particular to measure and control the resource used. Each module may include a processing device 313, 321 and a memory device 314, 322. In addition, the communication module includes a communication device 312 and the metrology module includes measurement and control circuitry 323. A communication path or bus 350 connects the two modules. Both the communication module and the metrology module may include computer executable instructions stored in their respective memories or in another type of computer-readable medium and may execute the instructions to provide the functions described herein. A network device 300 may also include additional modules (not shown) for additional network functions, such as a security module that may provide encryption-based security for communications on the network.

The network device mounted to the aerial device may be similar to the communication module illustrated in FIG. 3, but may include additional components. For example, the device may include a second communication device to communicate via another network, may include a battery or other power source, or may include imaging components as previously described.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communicating on a wireless mesh network, the method comprising:
providing a first network device on an aerial device;
positioning the aerial device in an aerial position to enable the first network device to wirelessly communicate with a first fixed network device via the wireless mesh network, wherein the first fixed network device includes a metrology module and a communications module and is associated with a fixed location, the metrology module is capable of measuring consumption of a resource at the fixed location, and the first fixed network device is capable of delivering resource measurement data indicating consumption of the resource at the fixed location, wherein the metrology module is capable of measuring consumption of a resource at the fixed location, wherein the first fixed network device is capable of providing resource measurement data indicating consumption of the resource at the fixed location;
receiving, by the first network device, a communication from the first fixed network device, wherein the communication includes the resource measurement data;
while the aerial device is in the aerial position, providing, by the first network device, the resource measurement data to a second network device;
while the aerial device is in the aerial position, receiving, by the first network device, a command to modify operations of the metrology module; and
providing, by the first network device and to the first fixed network device, the command to modify operations of the metrology module.

2. The method of claim 1, wherein providing the resource measurement data to the second network device comprises communicating with a second fixed network device via the wireless mesh network.

3. The method of claim 1, wherein providing the resource measurement data to the second network device comprises wirelessly communicating with the second network device via a second network.

4. The method of claim 1, wherein the aerial device ascends to the aerial position from a ground position and the aerial position is substantially aligned with the ground position.

5. The method of claim 1, further comprising:
positioning the aerial device in an additional aerial position to enable the first network device to wirelessly communicate with an additional fixed network device via the wireless mesh network, wherein the additional fixed network device is associated with an additional fixed location;

receiving, by the first network device, a communication from the additional fixed network device; and returning the aerial device to a ground position.

6. The method of claim 1, wherein positioning the aerial device in the aerial position comprises initiating a flight of the aerial device in response to one of the following: a detected network condition, a trigger, or a predetermined date and time.

7. The method of claim 1, further comprising:

storing, by the first network device, information received via the communication from the first fixed network device; and communicating the stored information to a third network device via the wireless mesh network upon one of: the aerial device returning to a ground position, or the aerial device being positioned such that the first network device is capable of wirelessly communicating with the third network device via the wireless mesh network.

8. The method of claim 1, wherein the wireless mesh network comprises multiple metering devices, each of the multiple metering devices including a respective metrology module and respective communication module, and receiving the communication from the first fixed network device comprises receiving the communication via the respective communication module included in at least one of the multiple metering devices.

9. An airborne network device, comprising:

a network device provided on an aerial device including:

a communication device configured to communicate with a plurality of fixed network devices via a wireless mesh network;

a memory device configured to store instructions for controlling operation of the network device; and a processing device configured to execute the instructions stored in the memory device to perform operations comprising:

when the aerial device is in a first aerial position:

communicating, by the network device, with a first fixed network device via the wireless mesh network, wherein the first fixed network device is associated with a first fixed location and includes a communication module and a metrology module, the metrology module being capable of measuring consumption of a resource at the first fixed location, the first fixed network device being capable of delivering resource measurement data based on the measured consumption, and receiving, by the network device, a communication from the first fixed network device, wherein the communication includes the resource measurement data;

when the aerial device is in a second aerial position:

communicating, by the network device, with a second fixed network device via the wireless mesh network, wherein the second fixed network device is associated with central system configured to receive, from the network device, the resource measurement data, and receiving, by the network device and from the central system, a command to modify operations of the metrology module; and when the aerial device returns to the first aerial position, providing, by the network device and to the first fixed network device, the command to modify operations of the metrology module.

10. The airborne network device of claim 9, wherein the network device provided on the aerial device stores information received from the first fixed network device in the memory device and transmits the information to the central system after returning to a ground position.

11. The device of claim 9, wherein the network device provided on the aerial device stores information received from the first fixed network device in the memory device and transmits the information to the central system while in flight.

12. The airborne network device of claim 9, further comprising components capable of collecting image data.

13. The airborne network device of claim 9, wherein a flight path of the aerial device is controlled remotely using guidance components provided on the aerial device.

14. The airborne network device of claim 9, wherein during a subsequent flight the network device communicates with the first fixed network device while at a third aerial position.

15. The airborne network device of claim 9, wherein the network device is one of a router or a collector.

16. The airborne network device of claim 9, wherein the memory device is further configured to store instructions for controlling operation of the plurality of fixed network devices.

17. A method for communicating on a wireless mesh network that includes a plurality of fixed network devices, the method comprising:

providing a first network device on an aerial device;

controlling the aerial device to enable the aerial device to move from a ground position to an aerial position, wherein:

the first network device is capable of wirelessly communicating with a first fixed network device via the wireless mesh network when the aerial device is in the aerial position, wherein:

the first fixed network device includes a metrology module and a communications module and is associated with a fixed location, the metrology module is capable of measuring consumption of a resource at the fixed location, and the first fixed network device is capable of delivering resource measurement data indicating consumption of the resource at the fixed location;

when the aerial device is in the aerial position, receiving, by the first network device, a communication from the first fixed network device, the communication including the resource measurement data, wherein:

the first fixed network device is configured to periodically communicate, while the aerial device is in the aerial position and via the first network device, the resource measurement data to a central system, and the aerial device is positioned in the aerial position based on a schedule of the periodic communications;

when the aerial device is in the aerial position, receiving, by the first network device and from the central system, a command to modify operations of the metrology module; and when the aerial device is in the aerial position, providing, by the first network device and to the first fixed network device, the command to modify operations of the metrology module.

* * * * *